United States Patent Office 3,166,541
Patented Jan. 19, 1965

3,166,541
SURFACE TREATED CARBON BLACK AS POLYMERIZATION CATALYST AND METHOD OF POLYMERIZATION THEREWITH
Adam Orzechowski, Brookline, and James C. MacKenzie, Wellesley Hills, Mass., assignors to Cabot Corporation, Boston, Mass., a corporation of Delaware
No Drawing. Filed Mar. 1, 1960, Ser. No. 11,961
11 Claims. (Cl. 260—93.7)

This invention relates to the polymerization and copolymerization of mono-olefins and di-olefins such as ethylene, propylene, butene-1, styrene, isoprene and butadiene and includes within its scope improved catalysts for such polymerization reactions.

Accordingly, it is a principal object of the present invention to provide a novel process for polymerizing mono- and di-olefins and mixtures thereof.

Other objects of the present invention will in part be obvious and will in part appear hereinafter.

In accordance with the present invention, mono- and di-olefins are polymerized or copolymerized by catalysts comprising (a) the product of the reaction carried out under certain conditions between a halide-type compound of a group IVa, Va, VIa, VIIa or VIII metal and finely divided carbon black having surface hydroxyl groups thereon, and (b) an organometallic compound. The polymerization or copolymerization reaction can be effected at suitable temperatures within the range of from about —25° C. to about 250° C., and pressures ranging from below atmospheric upwardly to any desired maximum pressure, for example, 30,000 p.s.i.g. or even higher pressures.

Carbon blacks suitable for the purposes of the present invention generally include any carbon black with hydroxyl groups on the surface thereof. For example, the channel carbon blacks, and furnace carbon blacks are all generally suitable for the purposes of the present invention. Definitely preferred, however, are those finely divided carbon blacks having a hydroxyl group content on the surface thereof of above about 0.5 milliequivalent per gram.

Halide-type compounds of groups IVa, Va, VIa, VIIa and VIII metals (hereinafter generally referred to as transition metal halides) suitable for the purposes of the present invention are the compounds conforming to the general empirical formula:

$$TO_aX_b$$

wherein T is a metal of group IVa, Va, VIa, VIIa or VIII (where the group numbers correspond to the Mendeleev Periodic System), O is oxygen, $a$ equals 0 or 1, each X is halogen, and $b$ is an integer from 1 to 7.

Examples of suitable compounds conforming to the general formula are halides of groups IVa, Va, VIa, VIIa and VIII metals such as titanium tetrachloride, zirconium tetrachloride, vanadium tetrachloride, titanium tetraiodide, chromium trichloride, tantalum pentabromide, molybdenum pentachloride, cobaltous bromide, and oxyhalides of groups IVa, Va, VIa, VIIa and VIII metals such as vanadium oxychloride, and mixtures thereof.

The conditions under which reaction between the transition metal halide and the finely divided carbon black can be accomplished are subject to considerable variation. However, in order to obtain a catalyst component with exceptionally high activity and reproducible character and performance, two relatively simple refinements have been found to be all important, namely (1) the carbon black should be essentially dry and anhydrous (i.e. free of molecular water in any form) at the time it is brought into contact with the transition metal halide and, (2) special provision should be made to withdraw gaseous by-products of the reaction (for example, HCl) from the reaction mixture. Generally, the said reaction can be carried out by contacting the carbon black with said transition metal halide, preferably in a solution thereof in an inert hydrocarbon medium, and maintaining the two reactants in intimate contact for a period of time sufficient to effect the desired chemical reaction resulting in the chemical bonding of the transition metal to the carbon black. The length of time required to effect a given amount of such reaction and chemical bonding is largely dependent upon the temperature of the reaction mixture and the rate of removal of the gaseous by-products. Generally speaking, almost any temperature above about 0° C. can be used satisfactorily, but room temperature or higher will generally be used. Assuming provision is made for intimate contact of the dried carbon black and the transition metal halide, and for active withdrawal of gaseous by-products, such as HCl, the time required to accomplish the chemical reaction needed will vary from periods of the order of hours (i.e. from about 0.5 hour to about 20 hours) at room temperature to periods of the order of minutes (i.e. from about 0.5 to about 20 minutes) at temperatures of 100° C. or over. Temperatures higher than a few hundred degrees centigrade, e.g. 500° C., are completely needless and therefore of little or no interest.

Although use of the transition metal halide in liquid or solution form gives excellent results, a particularly uniform reaction of the said metal halide with the carbon black can be effected if the latter is exposed to vapors of said metal halide at a temperature of from about 20° C. to about 250° C. for from a few minutes to about 1 hour or more depending upon the temperature and the rate of removal of the gaseous by-products. Said vapors can be supplied under their own vapor pressure using a partial vacuum if necessary, or with the aid of a dry inert carrier gas such as nitrogen. This vapor phase treatment can be accomplished in any suitable manner such as by circulating the vapors through the particulate carbon black in a fixed, moving or fluidized bed reactor.

Removal of the gaseous by-products of the reaction can be accomplished in many ways such as (a) by accomplishing the reaction under vacuum, (b) sweeping the reaction vessel with an inert gas such as (dry, oxygen-free) nitrogen, (c) by carrying out the reaction at sufficiently elevated temperatures while stirring to drive off the gaseous by-products, (d) by carrying out the reaction in a refluxing solvent and (e) by any combination of these.

The accomplishment of an actual chemical reaction between the carbon black and the transition metal halide is of utmost importance in obtaining the exceptionally active and efficient catalyst components described in this invention, e.g. the grams of polymer producible per gram of transition metal halid employed is generally highly dependent upon the proportion of the transition metal used which is chemically combined with the carbon black. This, in turn, is dependent largely on two main factors, each of which is separately controllable to a large extent. The first factor in question is the molar quantity of hydroxyl groups available on the surface of the carbon black per weight of said black. For a particular carbon black, such as channel black, for example, this first factor is largely a matter of (a) the fineness of subdivision of said carbon black and (b) the manner in which said carbon black was produced, the upper limit clearly being reached when the carbon black is ultra fine and the surface thereof is stoichiometrically covered with hydroxyl groups. In general carbon blacks having at least about 0.5 milliequivalent of surface hydroxyl groups per gram are definitely preferred.

The second factor in question is the proportion of the said surface hydroxyl groups which are actually chemically reacted with the transition metal halide with resultant loss of a gaseous by-product and formation of a chemical linkage of the transition metal to the carbon black.

In view of the above discussion it is clear that in preparing the surface reacted carbon blacks of the present invention, the smaller the average particle size of the carbon black and the larger the quantity of hydroxyl groups on the surface thereof, the greater will be the potential activity and efficiency of the resulting catalyst component producible therefrom. Accordingly, it is important to use as the starting material, carbon black having an average equivalent particle diameter of less than about 0.6 micron and preferably less than about 0.1 micron.

In short, to reduce this discussion of extent of reaction between the carbon black and the transition metal halide to the simplest possible terms, it is believed that the surface reacted carbon black can best be described and specified as follows: Preferred for imparting optimum catalytic activity and providing maximum catalyst efficiencies when used with a given organimetallic compound in a given system are those carbon blacks which have from between about 0.5 and about 5 millimoles of the transition metal chemically attached to the surface thereof per gram of said black. Still quite useful and practical, however, particularly when for other reasons amounts of 1 part or more by weight of the carbon black per 50 parts of the polymer product are desired, are those surface reacted carbon blacks which contain as little as 0.01 millimole of transition metal chemically combined to the surface thereof per gram of said carbon black. Although the mechanism of the reaction between the transition metal compound and the carbon black is not completely understood, it is believed that at temperatures from about 0° C. to about 300° C. and at even higher temperatures, and for periods of time ranging from the order of hours to minutes (in general, the lower the temperature, the longer the period of time required), the transition metal compound reacts with the hydroxyl groups on the surface of the carbon black liberating gaseous by-products such as HCl, which must be withdrawn from the reaction zone for optimum results. It is believed, but there is no intention to be bound by this explanation, that the type of reaction that occurs is correctly illustrated by the following illustrative equation, wherein tungsten hexachloride serves as the transition metal compound:

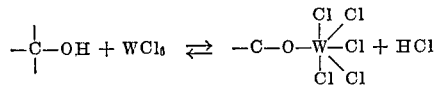

If the precaution of using a substantially anhydrous carbon black and/or removing the gaseous by-products such as HCl, are not observed, then the desired chemical reaction, such as that suggested by the above illustrative equation, either does not occur at all or does not predominate to the extent necessary to produce a superior active catalyst component. Instead the products obtained are very inferior as catalyst components in that in a given system involving a given quantity of carbon black and a given quantity of transition metal halide (a) enormously less polymer is produced and (b) reaction rates for production of polymer are enormously lower. Apparently, if the gaseous by-products such as hydrogen chloride, are not removed, retardation and even reversal of the reaction occurs either preventing the formation of the desired product having high catalytic activity, or contaminating it with harmful or inactive components.

Equally important in obtaining the desired reaction product is the use of a dry carbon black in the above reaction. Therefore, if the carbon black to be used contains molecular water in any form and/or tends to adsorb same on exposure to humid atmospheres, etc., it must be dried immediately before use or, after drying, must be maintained continuously out of contact with water or water vapor until used.

Also, it is pointed out that in order to obtain a catalyst component of the highest possible activity, aside from observing the above important precautions and reaction conditions, it is also recommended that the quantity of transition metal halide with which the carbon black is contacted be at least approximately sufficient to provide one atom of transition metal for each three hydroxyl groups on the surface of the carbon black, in order to minimize the possibility of leaving active hydroxyl groups unreacted since they might tend to deactivate a portion of the organometallic component of the catalyst which will be added subsequently. Moreover, it is generally desirable to use somewhat more than this minimum amount of transition metal halide, because the location of some hydroxyl groups and other factors favor the reaction illustrated by Equations 1 and 2, more frequently than that illustrated by Equations 4 and 5 which follow:

EQUATION 1

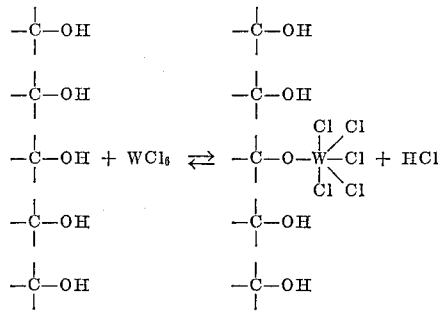

EQUATION 2

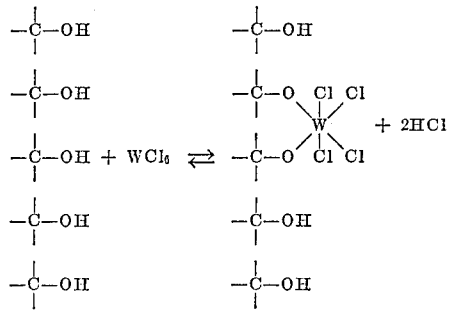

EQUATION 3

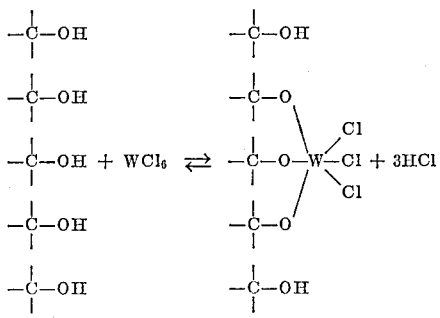

EQUATION 4

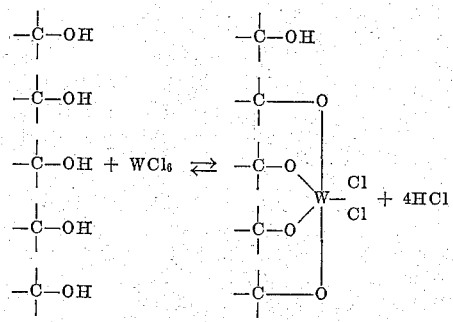

EQUATION 5

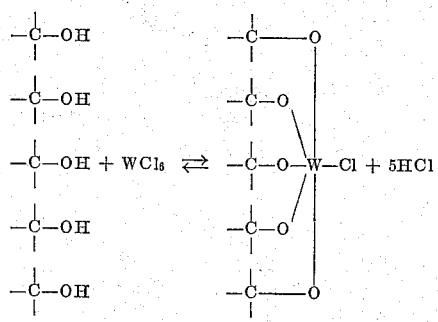

On the other hand, if more transition metal compound is introduced than will react, the excess is preferably removed before formation of the polymerization catalyst. Although the excess can be removed by extraction, it is obviously more desirable to avoid additional steps.

Organometallic compounds suitable for the purposes of the present invention are any of the compounds conforming to the general formula:

$$MM'_vX_nR_y$$

wherein M is a metal chosen from groups I, II or III of the periodic table; M' is a metal of group I of the periodic table; $v$ equal 0 or 1; each X is a halogen; $n$ equals 0, 1, 2, or 3; each R is any monovalent hydrocarbon radical or hydrogen; and $y$ equals 1, 2, 3 or 4.

Compounds of a single group I, II or III metal which are suitable for the practice of the invention include compounds conforming to the subgeneric formula:

$$M(R)_k$$

wherein M is a group I, II or III metal, such as lithium, sodium, beryllium, barium, boron, aluminum, copper, zinc, cadmium, mercury and gallium; wherein $k$ equals 1, 2 or 3 depending upon the valency of M which valency in turn depends upon the particular group (i.e. I, II or III) to which M belongs; and wherein each R may be any monovalent hydrocarbon radical. Examples of suitable R groups include an aryl or alkaryl radical, aliphatic hydrocarbon radical or derivative, such as alkyl, cycloalkylalkyl, cycloalkenylalkyl, arylalkyl, cycloalkyl, alkylcycloalkyl, arylcycloalkyl, cycloalkylalkenyl.

Specific examples of R groups for substitution in the above formula include methyl, ethyl, n-propyl, isobutyl, n-amyl, isoamyl, hexyl, n-octyl, n-dodecyl, and the like; 2-butenyl, 2-methyl-2-butenyl and the like; cyclopentylmethyl, cyclohexylethyl, cyclopentylethyl, methylcyclopentylethyl, 4-cyclohexenylethyl and the like; 2-phenylethyl, 2-phenylpropyl, α-naphthylethyl, methylnaphthylethyl, and the like: cyclophentyl, cyclohexyl, 2,2,1-bicycloheptyl, and the like; methylcyclopentyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Generally preferred, however, are the organo-compounds of groups I, II and III, such as methyl and butyllithium, pentenylsodium, dihexylmercury, diallylmagnesium, diethylcadmium, benzylpotassium, divinylmagnesium, di-p-tolylmercury, diethylzinc, tri-n-butylaluminum, methyl phenylmercury, diisobutyl ethylboron, diethylcadmium, di-n-butylzinc and tri-n-amylboron, and in particular the aluminum alkyls, such as trihexylaluminum, triethylaluminum, trimethylaluminum, and in particular triisobutylaluminum.

In addition, mono-organo-halides and hydrides of group II metals, and mono- or di-organo-halides and hydrides of group III metals conforming to the above general formula are also preferred. Specific examples of such compounds are diisobutylaluminum bromide, isobutylboron dichloride, methylmagnesium chloride, phenylmercuric iodide, ethylberyllium chloride, ethylcalcium bromide, hexylcupric chloride, diisobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride.

Also, compounds comprising a group I, II or III metal compound complexed with a group I metal compound if they conform to the above general formula, are generally suitable. Examples of such compounds are tetraethyllithium aluminum, tetrahexyllithium aluminum, trihexylpotassium aluminumchloride, triethyllithium aluminum bromide, tributylsodium zinc, tributyllithium zinc, trioctadecylpotassium aluminum hydride, diphenyldilithium and diphenylpotassium lithium.

Although it is appreciated that when R, in the above defined general formula, does not comprise at least one hydrocarbon radical, the groups I, II and III metal compounds of the present invention can not normally be termed organometallic compounds, compounds lacking at least one hydrocarbon radical comprise such a relatively small number of the total number of compounds included by said general formula that for the purposes of the present invention, it is intended that these compounds be included within the generic term, organometallic compound. Accordingly, in the specification and in the claims, it is intended, and therefore it should be understood, that the term, organometallic compound, refers to all the compounds included within the scope of the above defined general formula.

Using the catalysts of this invention, polymerization of the olefinic charging stock can be accomplished in the absence of liquids, solvents or diluents, for example, in the gas phase, but it is usually easier to effect polymerization in the presence of a substantially inert liquid reaction medium which functions as partial solvent for the monomer, a solvent for the organometallic compound, as a heat transfer agent, and as a liquid transport medium to remove normally solid polymerization products as a dispersion from the polymerization reactor, thus permitting efficient and continuous polymerization operations. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butanes, n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like are suitable. Also members of the aromatic hydrocarbon series, such as ethylbenzene, isopropylbenzene, sec-butylbenzene, t-butylbenzene, ethyltoluene, ethylxylenes, hemimellitene, pseudocumene, perhnitene, isodurene, diethylbenzenes, isoamylbenzene, and particularly the mononuclear aromatic hydrocarbons such as benzene, toluene, xylenes, mesitylene and xylene-p-cymene mixtures, and the like are completely suitable. Aromatic hydrocarbon fractions obtained by the selective extraction of aromatic naphthas, from hydroforming operations such as distillates or bottoms, from cycle stock fractions or cracking operations, etc., and certain alkyl naphthalenes which are liquid under the polymerization reaction conditions, for example, 1-methyl-naphthalene, 2-isopropyl-naphthalene, 1-n-amylnaphthalene and the like, or commercially produced fractions containing these hydrocarbons and the like are also suitable.

The proportion of surface reacted carbon black to organometallic compound utilized in preparing the catalyst is not usually a critical feature of the process. Moreover, if this proportion is expressed as a simple molar or weight ratio, it may not be particularly meaningful because, as indicated above, the efficiency of said surface reacted carbon black (on a weight or molar basis) is highly dependent upon the proportion of transition metal halide chemically combined therewith. Accordingly, in order to be most meaningful the relationship between catalyst components should be expressed as a function of the amount of transition metal compound which has reacted with the surface of the carbon black. We have found from experience that a molar ratio of from 0.1 to 3 mols of the organometallic compound per atom of transition metal chemically combined with the surface of the carbon black is to be preferred.

The quantity of catalyst i.e., comprising both the surface reacted finely divided carbon black and the organometallic compound, to be utilized in the polymerization reaction may vary, the precise proportion selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when a very fine particle size carbon black is utilized.

Harmful impurities in the liquid hydrocarbon reaction medium can be effectively neutralized prior to the formation therein, or addition thereto, of the catalyst or catalyst components by treating the liquid medium with a metal alkyl as set forth in U.S. 2,991,157 to Adam Orzechowski and James C. MacKenzie. The olefinic charging stocks can be purified by any known means such as bubbling said stocks through a solution of a metal alkyl in a hydrocarbon solvent prior to their introduction into the polymerization reactor.

The temperature control during the course of the polymerization process can be readily accomplished when a liquid hydrocarbon diluent is utilized because of the presence in the reaction zone of a large liquid mass having relatively high heat capacity. The liquid hydrocarbon reaction medium can be cooled by heat exchange inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative non-limiting examples:

Example 1

To a 1000 milliliter, three neck, glass reaction vessel there was added 10 grams of "Supercarbovar," a channel carbon black produced by Cabot Carbon Company, which had been treated with ozone at a temperature of about 25° C. for about 20 hours, had an average particle diameter of about 14 millimicrons and had a hydroxyl group content on the surface thereof of about 1.6 milliequivalents per gram. Said reaction vessel was then placed in a vacuum drying oven heated to a temperature of about 110° C. for about twelve hours. Subsequently, the vessel was sealed without exposing said carbon black to the atmosphere, and there were charged to said vessel 10 millimoles of titanium tetrachloride and 500 milliliters of isooctane. The vessel was then continuously stirred, and heated to, and maintained at the refluxing temperature of isooctane for a period of 5 hours, while the HCl produced was continuously removed by sweeping the reactor vessel with purified nitrogen. Subsequently, the extent of the reaction between the titanium tetrachloride and the carbon black was determined by measuring the quantity of HCl removed from the vessel by the nitrogen stream and by testing the liquid contents of the vessel for the absence therein of titanium tetrachloride, and the said carbon black was found to have a total of 10 milliatoms of titanium chemically bound to the surface thereof. 0.5 gram of this surface reacted carbon black containing about 0.5 milliatom of titanium on the surface thereof, and suspended in about 24 milliliters of isooctane was then transferred without exposure to the atmosphere from this reaction vessel to a 500 milliliter, three neck, glass reaction vessel which had been previously flushed with dry nitrogen. 100 milliliters of isooctane was then charged to this second vessel and the vessel was saturated with ethylene. Next, 0.5 millimole of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 27.5 grams of polyethylene which had a density of about 0.96 had been produced. The polymer product was a powdery material and was found to have a crystalline melting point of about 130–135° C. It was further found that none of the ethylene had been converted to a normally liquid product.

Example 2

This example was a duplicate of Example 1, except that the carbon black was not dried prior to treatment with the titanium tetrachloride. The treatment was carried out at the refluxing temperature of isooctane for 4 hours. The catalyst was then formed as in Example 1 and utilized in a polymerization reaction as in Example 1. The reaction products were analyzed and it was found that only 1.4 grams of polyethylene had been produced.

Example 3

This example was a duplicate of Example 1, except that although the treatment between the carbon black and the titanium tetrachloride took place under a nitrogen atmosphere, the reaction vessel was not continuously swept with a nitrogen stream, as was done in Example 1, and accordingly, no HCl was removed from the vessel during the period that the treatment took place. Also, the reaction was carried out at 25° C. for 2 hours rather than at the refluxing temperature of isooctane for 5 hours. Following formation of the catalyst and the use thereof in a polymerization reaction, all as described in Example 1, the reaction product was analyzed; it was found that 0.3 gram of polyethylene had been produced.

Example 4

To a 1000 milliliter, three neck, glass reaction vessel there was added 40 grams of "Supercarbovar" carbon black. Said reaction vessel was then placed in a vacuum drying oven heated to a temperature of about 110° C., for about twelve hours. Subsequently, the vessel was sealed without exposing said carbon black to the atmosphere and there were charged to said vessel 7.75 millimoles of titanium tetrachloride and 500 milliliters of isooctane. The vessel was then continuously stirred, and heated to, and maintained at, the refluxing temperature of isooctane for a period of 5 hours, while the HCl produced was continuously removed by sweeping the reactor vessel with purified nitrogen. Subsequently, the extent of the reaction between the titanium tetrachloride and the carbon black was determined by measuring the quantity of HCl removed from the vessel by the nitrogen stream, and by testing the liquid contents of the vessel for the absence therein of titanium tetrachloride, and the said carbon black was found to have a total of 7.75 milliatoms of titanium chemically bound to the surface thereof. 2.56 grams of this surface reacted carbon black containing about 0.5 milliatom of titanium on the surface thereof, and suspended in about 32 milliliters of isooctane was then transferred without being exposed to the atmosphere from this reaction vessel to a 500 milliliter, three neck, glass reaction vessel which had been previously flushed with dry nitrogen. 55 milliliters of isooctane was then charged to this second vessel and the vessel was saturated with ethylene. Next, 1.5 millimoles of triisobutyl aluminum was added and the contents of said second reaction vessel were continuously and vigorously stirred, and ethylene was continuously swept through the reaction vessel at a rate somewhat faster than its consumption for about four hours. The reaction products were analyzed and it was found that 22.5 grams of polyethylene had been produced.

*Example 5*

To a 1000 milliliter, three neck, glass reaction vessel there is added 10 grams of "Vulcan 9," a furnace carbon black produced by Cabot Carbon Co., and having an average particle size of about 20 millimicrons and a hydroxyl group content on the surface thereof of about 0.05 milliequivalent per gram. Said reaction vessel is then placed in a vacuum drying oven heated to a temperature of about 110° C., for about twelve hours. Subsequently, the vessel is sealed without exposing said carbon black to the atmosphere and there is charged to said vessel 0.5 millimole of vanadium oxychloride and 500 milliliters of isooctane. The vessel is then heated to and maintained at the refluxing temperature of isooctane for a period of 4 hours, while the HCl produced is continuously removed by sweeping the reactor vessel with purified nitrogen. Subsequently, the extent of the reaction between the carbon black and the vanadium oxychloride is determined by measuring the quantity of HCl removed from the vessel by the nitrogen stream, and by testing the liquid contents of the vessel for the absence therein of vanadium oxychloride and the said carbon black is found to have a total of 0.5 milliatom of vanadium on the surface thereof. 5 grams of this treated carbon black containing about 0.25 milliatom of vanadium on the surface thereof, and suspended in about 250 milliliters of isooctane is then transferred from this reaction vessel to a 500 milliliter, three neck, glass reaction vessel which has been previously flushed with dry nitrogen, and the vessel is then saturated with ethylene. Next, 0.75 millimole of butyl lithium is added and the contents of said second reaction vessel are continuously and vigorously stirred, and ethylene is continuously swept through the reaction vessel at a rate somewhat faster than its consumption for about four hours. The reaction products are analyzed and it is found that 12 grams of polyethylene have been produced.

*Example 6*

To a 1000 milliliter, three neck, glass reaction vessel there is added 10 grams of "Carbolac 2," a channel carbon black produced by Cabot Carbon Co., and having an average particle diameter of about 12 millimicrons and a hydroxyl group content of about 1.0 milliequivalent per gram. Said reaction vessel is then placed in a vacuum drying oven heated to a temperature of about 110° C., for about twelve hours. Subsequently, the vessel is sealed without exposing said carbon black to the atmosphere and there is charged to said vessel 10 millimoles of ferric bromide and 500 milliliters of benzene. The vessel is then heated to and maintained at the refluxing temperature of isooctane for a period of 4 hours, while the HBr produced is continuously removed by sweeping the reactor vessel with purified nitrogen. Subsequently, the extent of the reaction between the ferric bromide and the carbon black is determined by measuring the quantity of HBr removed from the vessel by the nitrogen stream, and by testing the liquid contents of the vessel for the absence therein of ferric bromide and the said carbon black is found to have a total of 10 milliatoms if iron bound to the surface thereof. 1 gram of this treated carbon black containing about 1 milliatom of iron bound to the surface thereof, and suspended in about 50 milliliters of benzene is then transferred from this reaction vessel to a 425 milliliter, stainless steel bomb which has been previously flushed with dry nitrogen. 50 milliliters of isooctane is then charged to this bomb and the bomb is saturated with ethylene. Next, 1 millimole of ethyl aluminum dichloride, and ethylene to a pressure of 300 p.s.i.g. are added to the bomb and the contents of said bomb are continuously and vigorously stirred for about 10 hours while ethylene is introduced to the bomb as needed to maintain the pressure therein at about 300 p.s.i.g. The reaction products are analyzed and it is found that 0.5 gram of polyethylene have been produced.

*Example 7*

To a 1000 milliliter, three neck, glass reaction vessel there is added 10 grams of "Vulcan 9." Said reaction vessel is then placed in a vacuum drying oven heated to a temperature of about 110° C., for about twelve hours. Subsequently, the vessel is sealed without exposing said carbon black to the atmosphere and there is charged to said vessel 0.5 millimole of tungsten hexachloride and 500 milliliters of benzene. The vessel is then heated to and maintained at the refluxing temperature of isooctane for a period of 4 hours, while the HCl produced is continuously removed by sweeping the reactor vessel with purified nitrogen. Subsequently, the extent of the reaction between the carbon black and the tungsten hexachloride is determined by measuring the quantity of HCl removed from the vessel and by testing the benzene for the absence therein of tungsten hexachloride and the said carbon black is found to have a total of 0.5 milliatom of tungsten bound to the surface thereof. 5 grams of this treated carbon black containing about 0.25 milliatom of tungsten bound to the surface thereof, and suspended in about 250 milliliters of benzene is then transferred from this reaction vessel to a 425 milliliter stainless steel bomb which has been previously flushed with dry nitrogen, and the bomb is then charged with propylene to a pressure of 300 p.s.i.g. Next, 1 millimole of lithium aluminum hydride is added and the contents of said bomb are continuously and vigorously stirred for about 20 hours while propylene is introduced to said bomb as needed to maintain the pressure therein at about 300 p.s.i.g. The reaction products are analyzed and it is found that 6 grams of polypropylene having a melting point of 175° C.–180° C. and a density of about 0.91 have been produced.

*Example 8*

To a 1000 milliliter, three neck, glass reaction vessel there is added 10 grams of the "Supercarbovar" carbon black utilized in Example 1. Said reaction vessel is then placed in a vacuum drying oven heated to a temperature of about 110° C., for about twelve hours. Subsequently, the vessel is sealed without exposing said carbon black to the atmosphere and there is charged to said vessel 10 millimoles of titanium tetraiodide and 500 milliliters of isooctane. The vessel is then heated to and maintained at the refluxing temperature of isooctane for a period of 4 hours, while the HI produced is continuously removed by sweeping the reactor vessel with purified nitrogen.

Subsequently, the extent of the reaction between the carbon black and the titanium tetraiodide is determined by measuring the quantity of HI removed from the vessel and by testing the liquid contents of the vessel for the absence therein of titanium tetraiodide and the said carbon black is found to have a total of 10 milliatoms of titanium bound to the surface thereof. 1 gram of this treated carbon black containing about 1 milliatom of titanium bound to the surface thereof, and suspended in about 50 milliliters of isooctane is then transferred from this reaction vessel to a 425 milliliter, stainless steel bomb which has been previously flushed with dry nitrogen. 50 milliliters of isooctane is then charged to the bomb and the bomb is saturated with butadiene. Next, 1 millimole of aluminum triethyl and 20 grams of liquid butadiene are added and the contents of the bomb are continuously and vigorously stirred, for about 16 hours. The reaction products are analyzed and it is found that 12 grams of polybutadiene have been produced.

*Example 9*

To a 1000 milliliter, three neck, glass reaction vessel there is added 10 grams of the "Supercarbovar" carbon black of Example 1. Said reaction vessel is then placed in a vacuum drying oven heated to a temperature of about 110° C., for about twelve hours. Subsequently, the vessel is sealed without exposing said carbon black to the atmosphere and there is charged to said vessel 0.5 millimole of tungsten hexachloride and 500 milliliters of isooctane. The vessel is then heated to and maintained at the refluxing temperature of isooctane for a period of 4 hours, while the HCl produced is continuously removed by sweeping the reactor vessel with purified nitrogen. Subsequently, the extent of the reaction between the carbon black and the tungsten hexachloride is determined by measuring the quantity of HCl removed from the vessel and by testing the liquid contents of the vessel for the absence therein of tungsten hexachloride and the said carbon black is found to have a total of 0.5 milliatom of tungsten bound to the surface thereof. 1 gram of this treated carbon black containing about 0.05 milliatom of tungsten bound to the surface thereof, and suspended in about 50 milliliters of isooctane is then transferred from this reaction vessel to a 425 milliliter, stainless steel bomb which has been previously flushed with dry nitrogen. 50 milliliters of isooctane, 20 grams of liquid butene-1 and 20 grams of liquid butadiene are charged to the bomb and the contents of the bomb are continuously and vigorously stirred for about 16 hours. The reaction products are analyzed and it is found that 25 grams of an elastomeric copolymer of butene and butadiene have been produced.

*Example 10*

To a 1000 milliliter, three neck, glass reaction vessel there was added 10 grams of "Carbolac 2" channel carbon black. Said reaction vessel was then placed in a vacuum drying oven heated to a temperature of about 110° C., for about twelve hours. Subsequently, the vessel was sealed without exposing said carbon black to the atmosphere and there was charged to said vessel 12 millimoles of titanium tetrachloride and 500 milliliters of isooctane. The vessel was then heated to and maintained at the refluxing temperature of isooctane for a period of 4 hours, while the HCl produced was continuously removed by sweeping the reactor vessel with purified nitrogen. Subsequently, the extent of the reaction between the carbon black, and the titanium tetrachloride was determined by measuring the quantity of HCl removed from the vessel and by testing the liquid contents of the vessel for the absence therein of titanium tetrachloride, and the said carbon black was found to have a total of 12 milliatoms of titanium bound to the surface thereof. 0.42 gram of this treated carbon black containing about 0.5 milliatom of titanium bound to the surface thereof, and suspended in about 20.7 milliliters of isooctane was then transferred from this reaction vessel to a 500 milliliter, three neck, glass reaction vessel which had been previously flushed with dry nitrogen. 80 milliliters of isooctane were then charged to this second vessel and the vessel was saturated with ethylene. Next, 0.05 millimole of triisobutyl aluminum was added and the contents of said second reaction were continuously and vigorously stirred, while ethylene was continuously swept through the reaction vessel at a rate somewhat faster than its consumption for about 4 hours. The reaction products were analyzed and it was found that 27.3 grams of polyethylene had been produced.

In one embodiment of the present invention, hydrogen is introduced into the reaction zone during the polymerization reaction. The introduction of hydrogen is not essential but generally substantially improves the yield and produces a larger proportion of xylene-soluble product. Also, the molecular weight of the product can generally be varied by varying the quantity of hydrogen utilized. Although the exact function of the hydrogen is not completely understood, and there is therefore, no intention to be bound by this explanation, it is believed that the hydrogen serves as a chain transfer agent, thereby promoting the dissociation of polymer chains from the polymerization sites of the catalyst and aiding the initiation and formation of additional polymer chains on said catalyst sites.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polyolefins.

Also, the polymers produced by the process of the present invention, especially the polymers having high specific viscosities can be blended with the lower molecular weight polyethylenes to impart stiffness or other desired properties thereto. The solid resinous products produced by the process of the present invention, can, likewise, be blended in any desired proportions with hydrocarbon oils, waxes, with high molecular weight polybutylenes, and with other organic materials. Small proportions between about 0.01 and about 1 percent of the various polymers produced by the process of the present invention can be dissolved or dispersed in hydrocarbon lubricating oils to increase V.I. and to decrease oil consumption when the compound oils are employed in motors. The polymerization products having molecular weights of 50,000 or more, can be employed in small proportions to substantially increase the viscosity of fluent liquid hydrocarbon oils and as gelling agents for such oils.

The polymers produced by the present process can also be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be crosslinked to effect increases in softening temperature, etc.

Obviously many changes may be made in the above described examples and procedure without departing from the scope of the invention. For example, although only transition metal chlorides, bromides, and iodides were mentioned in the above examples, transition metal fluorides are also suitable for the purposes of the present invention. For example, titanium tetrafluoride is entirely suitable.

Accordingly, it is intended that the above disclosure be regarded as illustrative and as in no way limiting the scope of the invention.

What we claim is:

1. A process for polymerizing a substance chosen from a group consisting of a mono-olefin, mixtures of mono-olefins, a di-olefin, mixtures of di-olefins, and mixtures thereof which comprises contacting said substance at temperatures between about −25° C. and 250° C. with a catalyst comprising (a) carbon black having an average particle diameter of less than about 0.1 micron and carrying in chemical combination on the surface thereof at least about $5 \times 10^{-4}$ equivalents per gram of structures conforming to the formula $$TO_aX_b$$

where T is a metal chosen from the group consisting of the metals of Groups IVa, Va, VIa, VIIa and VIII; O is oxygen; $a$ is a number from 0 to 1; each X is any halogen; $b$ is a number from 1 to 6; and where said structures are chemically linked directly from T to at least one oxygen atom in the surface of said carbon black, and (b) a compound conforming to the general formula $$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; and $y$ is a number from 1 to 4.

2. The process of claim 1 wherein the substance to be polymerized is ethylene.

3. The process of claim 1 wherein the substance polymerized is propylene.

4. The process of claim 1 wherein the substance polymerized is butene-1.

5. The process of claim 1 wherein each X in the formulae:

$$TO_aX_b$$

and $$MM'_vX_nR_y$$

is chlorine

6. A catalyst comprising carbon black having an average particle diameter of less than about 0.1 micron and carrying in chemical combination on the surface thereof at least about $5 \times 10^{-4}$ equivalents per gram of structures conforming to the formula $$TO_aX_b$$

where T is a metal chosen from the group consisting of the metals of Groups IVa, Va, VIa, VIIa and VIII; O is oxygen; $a$ is a number from 0 to 1; each X is any halogen; $b$ is a number from 1 to 6; and where said structures are chemically linked directly from T to at least one oxygen atom in the surface of said carbon black, and a compound conforming to the general formula:

$$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; and $y$ is a number from 1 to 4.

7. The catalyst of claim 6 wherein in said surface structures T is a metal of Group IVa.

8. The catalyst of claim 6 wherein in said surface structures T is titanium.

9. The catalyst of claim 6 wherein said carbon black comprises channel carbon black.

10. The catalyst of claim 6 wherein in the general formula:

$$MM'_vX_nR_y$$

$n$ is 0 and each R is any alkyl group.

11. The catalyst of claim 6 wherein in the general formula:

$$MM'_vX_nR_y$$

M is aluminum, $v$ is 0, $n$ is 0 and R is any alkyl group.

References Cited in the file of this patent

UNITED STATES PATENTS

| | | |
|---|---|---|
| 2,406,477 | Solomon et al. | Aug. 27, 1946 |
| 2,707,674 | Sweitzer | May 3, 1955 |
| 2,843,577 | Friedlander et al. | July 15, 1958 |
| 2,912,419 | Peters et al. | Nov. 10, 1959 |
| 2,919,266 | Lauer | Dec. 29, 1959 |
| 2,924,628 | Donaldson | Feb. 9, 1960 |
| 2,989,516 | Schneider | June 20, 1961 |
| 3,008,949 | Langer et al. | Nov. 14, 1961 |
| 3,054,754 | Lasky | Sept. 18, 1962 |

FOREIGN PATENTS

| | | |
|---|---|---|
| 592,111 | Italy | July 28, 1959 |
| 823,024 | Great Britain | Nov. 4, 1959 |